No. 858,240. PATENTED JUNE 25, 1907.
F. B. WERNER.
WIRE STRETCHER.
APPLICATION FILED SEPT. 13, 1906.
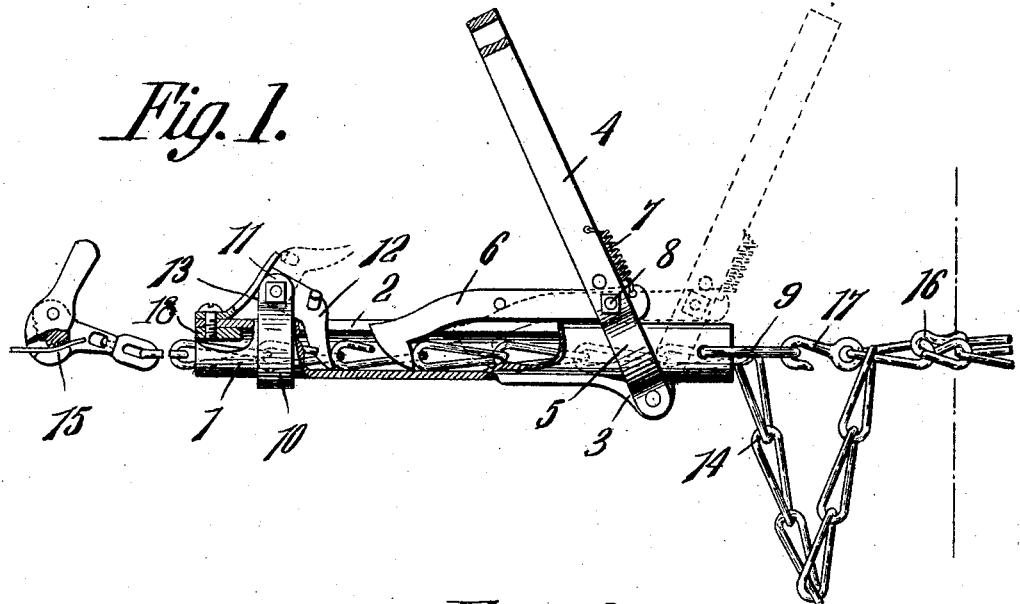
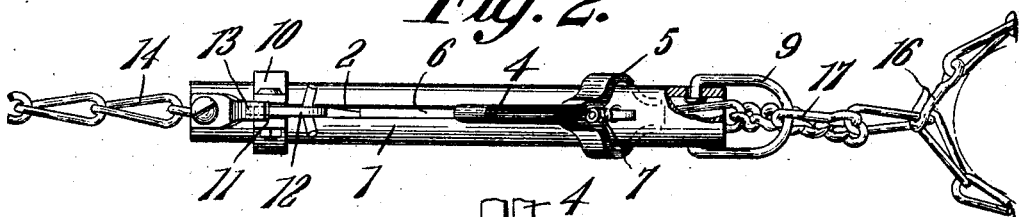
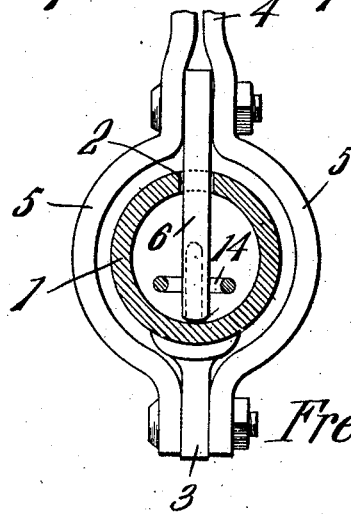
Fred B. Werner,
INVENTOR.
WITNESSES:
By C.A. Snow & Co.
ATTORNEYS

UNITED STATES PATENT OFFICE.

FREDERICK B. WERNER, OF DAVID CITY, NEBRASKA.

WIRE-STRETCHER.

No. 858,240.  Specification of Letters Patent.  Patented June 25, 1907.

Application filed September 13, 1906. Serial No. 334,460.

*To all whom it may concern:*

Be it known that I, FREDERICK B. WERNER, a citizen of the United States, residing at David City, in the county of Butler and State of Nebraska, have invented a new and useful Wire-Stretcher, of which the following is a specification.

This invention has relation to wire stretchers and it consists in the novel construction and arrangement of parts as hereinafter shown and described.

The object of the invention is to provide a wire stretcher of simple and cheap construction, one which is positive in its operation and of a simple and durable nature.

In the accompanying drawings:—Figure 1 is a side elevation of the wire stretcher with parts in section. Fig. 2 is a top plan view of the wire stretcher with parts in section and Fig. 3 is a transverse sectional view of the wire stretcher.

The stretcher comprises the tubular sleeve 1 which is provided in its side with an elongated opening 2. The lug 3 is secured to the sleeve 1 at the opposite side thereof from the opening 2. The lever 4 is provided with the bowed bifurcations 5 which receive between them the sleeve 1, the ends of the said bifurcations being fulcrumed to the lug 3. The hook 6 is pivoted to the lever 4 and the spring 7 is attached at one end to the said hook and at its other end to the said lever 4. The tension of said spring is such as to have a tendency to maintain the end of the hook 6 in the elongated opening 2 of the sleeve 1. A means is provided for adjusting the pivotal point 8 to the hook 6 along the lever 4 said means consisting of a series of perforations in the lever 4 as shown in Fig. 1 for the reception of the pivot 8. The bail 9 is pivotally attached to the end of the sleeve 1. The ring 10 passes around the sleeve 1 and is provided at its ends with the lugs 11. The dog 12 is pivoted between the said lugs 11. The flat spring 13 is attached to the sleeve 1, and has its other end located between the lugs 11, 11. The said flat spring 13 bears against the end of the dog 12 and is adapted to maintain the same either in depressed condition in the elongated opening 2 or elevated above the same. The chain 14 passes through the sleeve 1 and is provided at one end with a wire clamp 15 and at its other end with a hook 16 and at an intermediate point with the hook 17.

In operation the device works as follows:—The end of the chain 14 having the hook 16 is passed around the post or other fixed object and the said hook 16 is engaged with a link of the mid chain. Hook 17 is engaged with the bail 9. The end of the wire to be stretched is secured in the clamp 15, then by working the outer end of the lever 4 back and forth the hook 6 enters the links as they pass through the sleeve 1 and thus the wire is drawn taut, it being understood that the dog 12 has been previously lowered into the sleeve 1 through the opening 2. The said dog thus engages the links as they are advanced through the sleeve and prevents the same from working back through the sleeve as the outer end of the lever is drawn back to engage a new link. After the wire has been stretched and secured the dog 12 may be elevated above the opening 2 and thus the chain may be drawn back through the sleeve 1.

The block 18 is located in the end of the sleeve 1 and serves as a guide for the chain 14, and prevents the links thereof from becoming twisted.

Having described my invention what I claim as new and desire to secure by Letters Patent is:—

1. A wire stretcher comprising a tubular sleeve having an elongated opening, a lever fulcrumed upon said sleeve, a hook pivoted to said lever at a point between the fulcrum and the power end thereof and entering the opening of said sleeve, a dog pivotally mounted upon the sleeve and entering the opening thereof, a chain passing through the sleeve and having at its ends means for attachment.

2. A wire stretcher comprising a tubular sleeve having an elongated opening, a lever fulcrumed to the sleeve, a hook pivoted to the lever and entering the opening of the sleeve, means for adjusting the pivotal point of the hook upon the sleeve, a dog pivotally mounted upon the sleeve and entering the opening thereof, a chain passing through the sleeve and carrying at its ends attaching means.

3. A wire stretcher comprising a tubular sleeve having an elongated opening, a lever having bowed bifurcations which receive the sleeve and which are fulcrumed to the sleeve, a hook pivoted to the lever and entering the opening of the sleeve, a dog pivotally mounted upon the sleeve and entering the opening thereof, a chain passing through the sleeve and carrying at its ends attaching means.

4. A wire stretcher comprising a sleeve having an elongated opening, a lever fulcrumed to the sleeve, a hook pivoted to the lever and entering the opening of the sleeve a spring attached at one end to said hook and at its other end to said lever, a dog pivotally mounted upon the sleeve and adapted to enter the opening thereof, a spring mounted upon the sleeve and engaging said dog and adapted to hold the same within the sleeve opening or elevated above said opening, a chain passing through the sleeve and carrying at its ends attaching means.

In testimony that I claim the foregoing as my own, I have hereto affixed my signature in the presence of two witnesses.

FRED. B. WERNER.

Witnesses:
F. E. SCHAAF,
J. T. BAUGHAN.